United States Patent [19]

Akazawa et al.

[11] Patent Number: 4,640,870

[45] Date of Patent: Feb. 3, 1987

[54] LAMINATE STRUCTURE AND PRODUCTION OF THE SAME

[75] Inventors: Toshiyuki Akazawa; Yoshinari Tanaka, both of Kurashiki; Takuji Okaya, Nagaokakyo, all of Japan

[73] Assignee: Kuraray Co., Ltd., Kurashiki, Japan

[21] Appl. No.: 728,747

[22] Filed: Apr. 30, 1985

[30] Foreign Application Priority Data

May 9, 1984 [JP] Japan ................... 59-93556

[51] Int. Cl.$^4$ ............................................. B32B 27/06
[52] U.S. Cl. ..................................... 428/483; 428/35; 428/349; 428/522; 524/221; 524/207
[58] Field of Search ................ 428/349, 483, 522, 35; 525/221, 207

[56] References Cited

U.S. PATENT DOCUMENTS

| | | | |
|---|---|---|---|
| 4,376,845 | 3/1983 | Metzger | 525/221 |
| 4,420,580 | 12/1983 | Herman et al. | 525/221 |
| 4,472,485 | 9/1984 | Tabuse et al. | 428/483 |
| 4,562,118 | 12/1985 | Maruhashi et al. | 428/483 |

FOREIGN PATENT DOCUMENTS

| | | | |
|---|---|---|---|
| 5071556 | 11/1978 | Japan . | |
| 52337 | 3/1985 | Japan | 428/483 |
| 122148 | 6/1985 | Japan | 428/483 |

*Primary Examiner*—Edith Buffalow
*Attorney, Agent, or Firm*—Kramer and Brufsky

[57] ABSTRACT

There is provided a laminate structure comprising (A) a layer of saponified product of ethylene-vinyl acetate copolymer and (B) a layer of hydrophobic thermoplastic resin, with (C) a bonding interlayer placed therebetween which comprises a composition of (X) a polymer of ethylene-acrylate ester-ethylenic unsaturated carboxylic acid or anhydride thereof and (Y) a polymer of ethylene-acrylate ester.

The laminate is superior in interlaminar adhesion and gas barrier properties, and is suitable for food packaging.

2 Claims, No Drawings

LAMINATE STRUCTURE AND PRODUCTION OF THE SAME

BACKGROUND OF THE INVENTION

1. Field of the Invention

The present invention relates to a coextruded laminate structure which is superior in gas barrier properties and interlaminar strength, and more particularly it relates to a laminate structure formed by laminating (A) a layer of saponified product of ethylene-vinyl acetate copolymer and (B) a layer of hydrophobic thermoplastic resin, especially saturated polyester resin, one over the other, with (C) a layer of ethylene-acrylate ester polymer of specific composition interposed therebetween.

2. Description of the Prior Art

With the recent remarkable technical innovation in the food packaging industry, thermoplastic resins such as saturated polyester have come into the market because of their hygienic qualities, good appearance, and lightness which leads to a reduction of transportation cost. Saturated polyesters, however, are not suitable for long storage of foods and carbonated beverages because of their poor gas barrier properties. For this reason, glass bottles and metal cans are predominant in this area, but they are not completely satisfactory because they cause environmental pollution when thrown away on the road and require a great deal of expense for recovery after use. These factors promoted the development of a new packaging material.

The saponified product of ethylene-vinyl acetate copolymer containing 20 to 55 mol% of ethylene is superior in transparency and gas barrier properties which are desirable for food packaging; however, it is not necessarily satisfactory because of its insufficient stiffness and moisture resistance. On the other hand, saturated polyester resin, particularly hydrophobic thermoplastic resin composed mainly of polyethylene terephthalate has a good balance between impact resistance and stiffness and is superior in hygienic qualities. Nevertheless, it finds only limited use in food packaging because of its insufficient gas barrier properties (for oxygen and carbon dioxide).

In order to obtain a food packaging material having both of the superior gas barrier properties of the saponified product of ethylene-vinyl acetate copolymer and the superior mechanical properties of saturated polyester resin, it is conceivable that layers of both resins may be laminated one over the other. However, it is impossible to make a laminate by simple heat bonding because the two polymers have no affinity for each other.

It is disclosed in Japanese Patent Laid-open No. 71556/1980 that there is adhesion between a polymer composed of ethylene, acrylate ester, and ethylenic carboxylic acid or anhydride thereof and a saturated polyester resin. According to this disclosure, the former polymer is produced by chemically bonding an ethylenic unsaturated fatty acid or anhydride thereof to a copolymer of ethylene and carboxyl-containing monomer, such as ethylene-vinyl acetate copolymer, ethylene-acrylate ester copolymer, and ethylene-methacrylate ester copolymer. There is demonstrated in the specification that such a copolymer can be bonded to a saturated polyester resin.

It is disclosed in Japanese Patent Laid-open No. 101883/1979 that a thermoplastic resin can be laminated to the saponified product of ethylene-vinyl acetate copolymer with an interlayer of modified copolymer placed therebetween. The modified copolymer is obtained by chemically bonding an ethylenic unsaturated fatty acid or anhydride thereof to a copolymer of ethylene and carboxyl-containing or substituted carboxyl-containing monomer.

There is disclosed in Japanese Patent Laid-open No. 110282/1979 a laminate structure having a layer of saponified product of ethylene-vinyl acetate copolymer. In this case, the bonding interlayer is a metal-modified copolymer which is produced by chemically bonding an ethylenic unsaturated carboxylic acid or anhydride thereof to a copolymer of ethylene and carboxyl-containing or substituted carboxyl-containing monomer, followed by reaction with a metal salt.

As mentioned above, the bonding interlayer for lamination is made of a copolymer composed of ethylene, acrylate ester, and ethylenic carboxylic acid or anhydride thereof. Such a bonding layer is selective in adhesion depending on the type of layers to be bonded. This makes it necessary to select a proper bonding interlayer according to individual layers.

If a polymer with high adhesion composed of ethylene, acrylate ester, and ethylenic unsaturated carboxylic acid or anhydride thereof is used alone for bonding layers of saponified product of ethylene-vinyl acetate copolymer and saturated polyester resin, the resulting laminate is poor in appearance due to irregularities and streaks. If the copolymer is replaced by the one having low adhesion to improve the appearance of the laminate, it is not suitable for coextrusion to be run at a high speed, although it provides sufficient adhesion at a low lamination rate.

SUMMARY OF THE INVENTION

With the above mentioned in mind, the present inventors reviewed the characteristic properties required for the bonding resin used in industrial coextrusion. Based on this review, they investigated how the properties of the bonding resin affect extrudability and adhesion in coextrusion. As the result, it was found that sufficient adhesion is obtained in coextrusion at an industrially high speed, if a specific bonding resin composition is employed. Such a composition is superior to a simple copolymer in adhesion. The present invention was completed on the basis of these findings.

These findings are not conjectured from the above-mentioned patent describing that adhesion to a saturated polyester resin and a saponified product of ethylene-vinyl acetate copolymer is produced by a copolymer of ethylene with a carboxyl group-containing or substituted carboxyl-containing monomer such as vinyl acetate, acrylate ester, and methacrylate ester.

The gist of this invention resides in a laminate structure and a method for producing the same, said laminate structure comprising (A) a layer of saponified product of ethylene-vinyl acetate copolymer containing 20 to 55 mol% of ethylene and having a degree of saponification of at least 90 mol% and (B) a layer of hydrophobic thermoplastic resin, with (C) a bonding interlayer placed therebetween which comprises a composition of (X) a polymer of ethylene-acrylate ester-ethylenic unsaturated carboxylic acid or anhydride thereof and (Y) a polymer of ethylene-acrylate ester, said polymers (X) and (Y) being formulated so that the following formulas (I), (II), (III), and (IV) are satisfied.

$$|Vx-Vy| \leq 0.15 \quad (I)$$

$$0.10 \leq Vx \cdot Wx + Vy \cdot Wy \leq 0.45 \quad (II)$$

$$0.03 \leq Cx \cdot Wx \leq 1 \quad (III)$$

$$0.05 \leq Wx/Wy \leq 10 \quad (IV)$$

where:
- Vx: content (in weight fraction) of acrylate ester in polymer (X)
- Vy: content (in weight fraction) of acrylate ester in polymer (Y),
- Cx: content (in meq/g) of carboxyl group of ethylenic unsaturated carboxylic acid or anhydride thereof in polymer (X),
- Wx: quantity (in weight fraction) of polymer (X), and
- Wy: quantity (in weight fraction) of polymer (Y).

It is the object of this invention to provide a laminate for food packaging which is superior in mechanical properties attributable to the layer of hydrophobic thermoplastic resin and gas barrier properties attributable to the layer of saponified product of ethylene-vinyl acetate copolymer, the two layers being bonded with an interlayer having good adhesion.

DETAILED DESCRIPTION OF THE INVENTION

The important feature of this invention is that the bonding interlayer (C) comprises a composition of (X) a polymer of ethylene-acrylate ester-ethylenic unsaturated carboxylic acid or anhydride thereof and (Y) a polymer of ethylene-acrylate ester, said polymers (X) and (Y) being formulated so that the following formulas (I), (II), (III), and (IV) are satisfied.

$$|Vx-Vy| \leq 0.15 \quad (I)$$

$$0.10 \leq Vx \cdot Wx + Vy \cdot Wy \leq 0.45 \quad (II)$$

$$0.03 \leq Cx \cdot Wx \leq 1 \quad (III)$$

$$0.05 \leq Wx/Wy \leq 10 \quad (IV)$$

where:
- Vx: content (in weight fraction) of acrylate ester in polymer (X)
- Vy: content (in weight fraction) of acrylate ester in polymer (Y),
- Cx: content (in meq/g) of carboxyl group of ethylenic unsaturated carboxylic acid or anhydride thereof in polymer (X),
- Wx: quantity (in weight fraction) of polymer (X), and
- Wy: quantity (in weight fraction) of polymer (Y).

What is important in this invention is that polymer (X) and polymer (Y) should be selected so that the difference in their content of acrylate ester is not more than 0.15 in terms of weight fraction. This provides sufficient adhesion in high-speed coextrusion. In addition, the composition of polymer (X) and polymer (Y) formulated so that the above-mentioned four formulas are satisfied provides a laminate having a good appearance. The reason for this is not fully elucidated yet. It is considered that the two polymers are not completely miscible with each other because of the difference in the content of acrylate ester and the presence and absence of ethylenic carboxylic acid or anhydride thereof. This slight immiscibility causes microscopic phase separation at the time of coextrusion, permitting one polymer to adhere to the layer of saturated polyester resin and the other polymer to adhere to the layer of saponified product of ethylene-vinyl acetate copolymer. If $|Vx-Vy|$ is greater than 0.15, the intended effect of this invention is not produced, presumably because polymer (X) and polymer (Y) are excessively immiscible with each other. It is a surprise that the composition of polymer (X) and polymer (Y) in proper formulation provides higher adhesion than the individual polymers.

If $Vx \cdot Wx + Vy \cdot Wy$ is smaller than 0.10, the composition decreases in adhesion to the layer of hydrophobic thermoplastic resin, particularly saturated polyester. On the other hand, if it exceeds 0.45, the composition does not increase any longer in adhesion to the layer of hydrophobic thermoplastic resin, particularly saturated polyester, and decreases in adhesion to the layer of saponified product of ethylene-vinyl acetate copolymer.

If $Cx \cdot Wx$ is smaller than 0.03 meq/g, the composition is poor in adhesion to the layer of saponified product of ethylene-vinyl acetate copolymer and the layer of saturated polyester resin in high-speed coextrusion. If $Cx \cdot Wx$ is greater than 1 meq/g, the composition causes the yellowing of coextruded layers or causes fish-eyes to appear on the layers.

Polymer (X) and polymer (Y) should be mixed in the ratio of 0.05 to 10. If Wx/Wy is smaller than 0.05 or greater than 10, the effect of this invention is not produced. Presumably this is because the microscopic phase separation is not adequate for good adhesion.

Polymer (X) composed of ethylene, acrylate ester, and ethylenic carboxylic acid or anhydride thereof is not specifically restricted; but it should preferably contain acrylate ester in an amount of 0.03 to 0.45 in terms of weight fraction and ethylenic unsaturated carboxylic acid or anhydride thereof in an amount of 0.02 to 2 meq/g as carboxyl group, and have a melt flow rate (MI) of 0.2 to 300 g/10 minutes (190° C., 2160 g).

Polymer (X) may be produced in any manner, for example, by grafting an ethylene-acrylate ester copolymer with an ethylenic unsaturated carboxylic acid or anhydride thereof such as maleic acid, acrylic acid, itaconic acid, and maleic anhydride, by partially saponifying the acrylate ester component in an ethylene-acrylate ester copolymer, or by terpolymerizing ethylene, acrylate ester, and an ethylenic carboxylic acid such as acrylic acid and methacrylic acid. A preferable one is produced by grafting an ethylene-acrylate ester copolymer with maleic acid alone or in combination with styrene. The acid component should not be neutralized with a metal because the salt decreases adhesion.

Polymer (Y) composed of ethylene and acrylate ester is not specifically restricted; but it should preferably contain acrylate ester in an amount of 0.03 to 0.50 in terms of weight fraction and have a melt flow rate (MI) of 0.8 to 60 g/10 minutes (190° C., 2160 g). The acrylate ester component in polymer (Y) denotes a lower ($C_1$–$C_8$) fatty alcohol ester of acrylic acid or methacrylic acid. It includes, for example, methyl acrylate, ethyl acrylate, butyl acrylate, and 2-ethylhexyl acrylate. Preferable among them is ethyl acrylate.

Layer (A) of the laminate of this invention is produced from the saponified product of ethylene-vinyl acetate copolymer containing 20 to 55 mol% of ethylene and having a degree of saponification of at least 90 mol%. If the ethylene content is lower than 20 mol%, the saponified resin is difficult to perform melt molding, and if it is higher than 55 mol%, the resulting laminate is poor in gas barrier properties. The degree of saponification of vinyl acetate component should be at least 90 mol. %. If it is lower than 90 mol%, the resulting laminate is poor in gas barrier properties and other physical properties such as heat resistance and water resistance.

Layer (B) of the laminate of this invention is produced from a hydrophobic thermoplastic resin which is capable of melt molding. A preferred one is a saturated polyester resin formed by polycondensation of dicarboxylic acid and diol. The dicarboxylic acid includes, for example, terephthalic acid, isophthalic acid, and naphthalenedicarboxylic acid. They may be individually or in combination with one another. The diol includes, for example, ethylene glycol, butylene glycol, hexylene glycol, and cyclohexane dimethanol. They may be used individually or in combination with one another. In addition, they may be mixed with a small amount of diethylene glycol, polytetramethylene glycol, pentaerythritol, and/or bisphenol A. In the case where at least 70 mol% of terephthalic acid is used as the dicarboxylic acid component, the resulting laminate is superior in transparency and mechanical properties.

The adhesion properties of a resin in coextrusion cannot be predicted from the result obtained in hot press adhesion. In most cases, adhesion in coextrusion is much lower than hot press adhesion. This is pronounced in the case where coextrusion is performed at a high rate. Presumably, this is because the laminate is stretched in a short time while being cooled after emergence from the molding machine. In contrast to this general tendency, the bonding layer of this invention provides high adhesion even when coextrusion is performed at a take-up speed of at least 3 m/min. The take-up speed denotes one which is measured at a point where the coextruded polymer has been cooled to 40° C.

The individual layers of the laminate produced as mentioned above are not specifically limited in thickness; but the preferred thicknesses of layers (A), (B), and (C) are 10 to 400 μm, 200 to 3000 μm, and 5 to 300 μm, respectively.

On account of high interlaminar bond strength and superior gas barrier properties, the laminate of this invention is useful as a food packaging material, e.g., cups and bottles. The laminate may undergo monoaxial or biaxial stretching or deep drawing for further improvement of properties.

The bonding layer (C) produces the best results when it is made by extrusion molding with a T-die or ring die. It may also be applied to blow molding to reduce the molding cycle. In the case of blow molding, the layer (B) of hydrophobic thermoplastic resin may be placed either inside or outside. Multilayered laminates having such layer arrangement as (A)-(C)-(B), (B)-(C)-(A)-(C)-(B), and (A)-(C)-(B)-(C)-(A) are within the scope of this invention. The laminate of this invention may further be laminated with a layer of polyolefin such as polyethylene, polypropylene, ethylene-vinyl acetate copolymer, and ethylene-ethyl acrylate copolymer.

The invention is described in more detail with reference to the following examples, which are not intended to limit the scope of this invention.

EXAMPLE 1

In 1000 parts by weight of purified xylene were dissolved 150 parts by weight of ethylene-ethyl acrylate copolymer (containing 27 wt% of ethyl acrylate and having an MI of 200 g/10 min at 190° C., 2160 g) and 40 parts by weight of maleic anhydride. To this solution was added with stirring 0.6 parts by weight of benzoyl peroxide dissolved in 50 parts by weight of xylene over 2 hours, while the solution was kept at 150° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 25.9 wt% of ethyl acrylate and 0.84 meq/g of carboxyl group and having an MI of 120 g/10 min (as measured at 190° C. and 2160 g).

Polymer (X) thus obtained was mixed with ethylene-ethyl acrylate copolymer (Y) containing 20 wt% of ethyl acrylate and having an MI of 6, the mixing ratio of X/Y being 20/80. The resulting composition was found to have the following values which satisfy the above-mentioned four formulas (I) to (IV).

$$|V_x - V_y| = 0.059$$

$$V_x \cdot W_x + V_y \cdot W_y = 0.212$$

$$C_x \cdot W_x = 0.168$$

$$W_x / W_y = 0.25$$

Using this composition for the bonding layer (C), layer (A) and layer (B) were laminated one over the other. The resin for layer (A) was produced from saponified product of ethylene-vinyl acetate copolymer which was obtained by saponifying 99.6 mol% of vinyl acetate in ethylene-vinyl acetate copolymer containing 67 mol% of vinyl acetate. The saponified product had an intrinsic viscosity [μ] of 1.11 as measured in 85:15 phenol/water mixture at 30° C. and dl/g. The saturated polyester resin for layer (B) was produced by polycondensation of terephthalic acid and a 72:28 (molar ratio) mixture of ethylene glycol and cyclohexane dimethanol. This resin had an intrinsic viscosity [η] of 0.66 as measured in 50:50 phenol/tetrachloroethane mixture at 30° C. and dl/g.

Lamination was performed as follows: The resin for layer (B) was fed to extruder I having a bore diameter of 120 mm, the resin for layer (C) was fed to extruder II having a bore diameter of 60 mm, and the resin for layer (A) was fed to extruder III having a bore diameter of 90 mm. Extruders I and II are designed such that the melt is split into two layers. Thus the extrudates from the three extruders were laminated one over another in the order of (B)/(C)/(A)/(C)/(B). The die temperature was 260° C. and the take-up speed was 7 m/min. The thicknesses of layers (A), (B), and (C) were 60 μm, 600 μm, and 30 μm, respectively. Peel strength (T-peeling at 200 mm/min) between layers (A) and (B) was 2.1 kg/cm.

EXAMPLE 2

In 1000 parts by weight of purified xylene were dissolved 100 parts by weight of ethylene-ethyl acrylate copolymer (containing 25 wt% of ethyl acrylate and having an MI of 6 g/10 min at 190° C., 2160 g) and 20 parts by weight of maleic anhydride. To this solution was added with stirring 0.8 parts by weight of benzoyl peroxide dissolved in 100 parts by weight of xylene over 3 hours, while the solution was kept at 140° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 24.3 wt% of ethyl acrylate and 0.57 meq/g of carboxyl group and having an MI of 3.2 g/10 min (as measured at 190° C. and 2160 g).

Polymer (X) thus obtained was mixed with ethylene-ethyl acrylate copolymer (Y) containing 25 wt% of ethyl acrylate and having an MI of 6, the mixing ratio of X/Y being 52/48. The resulting composition was found to have the following values which satisfy the above-mentioned four formulas (I) to (IV).

$|V_x - V_y| = 0.007$ $V_x \cdot W_x + V_y \cdot W_y = 0.246$ $C_x \cdot W_x = 0.296$ $|W_x/W_y| = 1.08$ Using this composition for the bonding layer (C), layer (A) and layer (B) were laminated one over the other. The resin for layer (A) was produced from saponified product of ethylene-vinyl acetate copolymer which was obtained by saponifying 99.5 mol% of vinyl acetate in ethylene-vinyl acetate copolymer containing 56 mol% of vinyl acetate. The saponified product had an intrinsic viscosity [η] of 0.96 as measured in 85:15 phenol/water mixture at 30° C. and dl/g. The saturated polyester resin for layer (B) was produced by polycondensation of a 98:2 (molar ratio) mixture of terephthalic acid and isophthalic acid and a 90:10 (molar ratio) mixture of ethylene glycol and cyclohexane dimethanol. This resin had an intrinsic viscosity [η] of 0.60 as measured in 50:50 phenol/tetrachloroethane mixture at 30° C. and dl/g.

Lamination was performed as follows: The resin for layer (A) was fed to extruder I having a bore diameter of 95 mm, the resin for layer (C) was fed to extruder II having a bore diameter of 60 mm, and the resin for layer (B) was fed to extruder III having a bore diameter of 110 mm. Thus the extrudates from the three extruders were laminated one over another in the order of (A)/(B)/(C). The die temperature was 260° C. and the take-up speed was 7 m/min. The thicknesses of layers (A), (B), and (C) were 150 μm, 1300 μm, and 40 μm, respectively. Peel strength between layers (A) and (B) was 2.2 kg/cm.

EXAMPLE 3

In 1000 parts by weight of purified xylene were dissolved 100 parts by weight of ethylene-ethyl acrylate copolymer (containing 35 wt% of ethyl acrylate and having an MI of 20 g/10 min at 190° C., 2160 g) and 100 parts by weight of maleic anhydride. To this solution was added with stirring 1.5 parts by weight of benzoyl peroxide dissolved in 100 parts by weight of xylene over 2 hours, while the solution was kept at 150° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 32.5 wt% of ethyl acrylate and 1.27 meq/g of carboxyl group and having an MI of 14 g/10 min (as measured at 190° C. and 2160 g).

Polymer (X) thus obtained was mixed with ethylene-ethyl acrylate copolymer (Y) containing 25 wt% of ethyl acrylate and having an MI of 6, the mixing ratio of X/Y being 1.5/10. The resulting composition was found to have the following values which satisfy the above-mentioned four formulas (I) to (IV).

$|V_x - V_y| = 0.075$ $V_x \cdot W_x + V_y \cdot W_y = 0.260$ $C_x \cdot W_x = 0.166$ $W_x/W_y = 0.15$ Using this composition for the bonding layer (C), there was obtained a three-layered laminate made up of (A)/(C)/(B) in the same way as in Example 2. The thicknesses of layers (A), (B), and (C) were 150 μm, 1400 μm, and 45 μm, respectively. Peel strength between layers (A) and (B) was 2.1 kg/cm.

EXAMPLE 4

In 1000 parts by weight of purified xylene were dissolved 100 parts by weight of ethylene-ethyl acrylate copolymer (containing 20 wt% of ethyl acrylate and having an MI of 4.5 g/10 min at 190° C., 2160 g) and 100 parts by weight of maleic anhydride. To this solution was added with stirring 0.2 parts by weight of benzoyl peroxide dissolved in 100 parts by weight of xylene over 2 hours, while the solution was kept at 150° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 19.9 wt% of ethyl acrylate and 0.303 meq/g of carboxyl group and having an MI of 30 g/10 min (as measured at 190° C. and 2160 g).

Polymer (X) thus obtained was mixed with ethylene-ethyl acrylate copolymer (Y) containing 25 wt% of ethyl acrylate and having an MI of 6, the mixing ratio of X/Y being 20/80. The resulting composition was found to have the following values which satisfy the above-mentioned four formulas (I) to (IV).

$|V_x - V_y| = 0.051$ $V_x \cdot W_x + V_y \cdot W_y = 0.240$ $C_x \cdot W_x = 0.061$ $W_x/W_y = 0.25$ Using this composition for the bonding layer (C), there was obtained a five-layered laminate made up of (B)/(C)/(A)/(C)/(B) in the same way as in Example 1. The thicknesses of layers (A), (B), and (C) were 200 μm, 700 μm, and 45 μm, respectively. Peel strength between layers (A) and (B) was 2.0 kg/cm.

COMPARATIVE EXAMPLE 1

Coextrusion was performed in the same way as in Example 1 except that the component Y was ethylene-ethyl acrylate copolymer containing 7 wt% of ethyl acrylate and having an MI of 4. The composition of (X) and (Y) had the following values.

$|Vx - Vy| = 0.189$ $Vx \cdot Wx + Vy \cdot Wy = 0.108$ $Cx \cdot Wx = 0.168$ $Wx/Wy = 0.25$ These values satisfy the formulas (II) to (IV), but do not satisfy the formula (I). The resulting laminate was poor in appearance due to fine irregularities. Peel strength was 0.6 kg/cm, which is not sufficient for practical use.

COMPARATIVE EXAMPLE 2

Coextrusion was performed in the same way as in Example 4 except that the component Y was ethylene-ethyl acrylate copolymer containing 20 wt% of ethyl acrylate and having an MI of 6 and the mixing ratio X/Y was 7/100. The composition of (X) and (Y) had the following values.

$|Vx - Vy| = 0.001$ $Vx \cdot Wx + Vy \cdot Wy = 0.200$ $Cx \cdot Wx = 0.020$ $Wx/Wy = 0.07$ These values satisfy the formulas (I), (II), and (IV), but do not satisfy the formula (III). The resulting laminate was good in appearance; but peel strength was 0.6 kg/cm, which is not sufficient for practical use.

COMPARATIVE EXAMPLE 3

In 1000 parts by weight of purified xylene were dissolved 100 parts by weight of ethylene-ethyl acrylate copolymer (containing 7 wt% of ethyl acrylate and having an MI of 4.5 g/10 min at 190° C., 2160 g) and 20 parts by weight of maleic anhydride. To this solution was added with stirring 0.8 parts by weight of benzoyl peroxide dissolved in 100 parts by weight of xylene over 3 hours, while the solution was kept at 140° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 6.8 wt% of ethyl acrylate and 0.663 meq/g of carboxyl group and having an MI of 1.9 g/10 min (as measured at 190° C. and 2160 g).

Polymer (X) thus obtained was mixed with ethylene-ethyl acrylate copolymer (Y) containing 7 wt% of ethyl acrylate and having an MI of 4.5, the mixing ratio of X/Y being 50/50. The resulting composition was found to have the following values which satisfy the formulas (I), (III), and (IV), but do not satisfy the formula (II).

$|Vx - Vy| = 0.002$ $Vx \cdot Wx + Vy \cdot Wy = 0.069$ $Cx \cdot Wx = 0.332$ $Wx/Wy = 1.0$ Using this composition for layer (C), lamination was performed in the same way as in Example 1. The resulting laminate was good in appearance, but peel strength was only 0.2 kg/cm.

COMPARATIVE EXAMPLE 4

Coextrusion was performed in the same way as in Comparative Example 3 except that the component Y was ethylene-ethyl acrylate copolymer containing 40 wt% of ethyl acrylate and having an MI of 20 g/10 min. The composition of (X) and (Y) had the following values.

$|Vx - Vy| = 0.332$ $Vx \cdot Wx + Vy \cdot Wy = 0.234$ $Cx \cdot Wx = 0.332$ $Wx/Wy = 1.0$ These values satisfy the formulas (II) to (IV), but do not satisfy the formula (I). The resulting laminate was poor in appearance due to fine irregularities. Peel strength was 0.7 kg/cm, which is not sufficient for practical use.

COMPARATIVE EXAMPLE 5

In 1000 parts by weight of purified xylene were dissolved 100 parts by weight of ethylene-ethyl acrylate copolymer (containing 40 wt% of ethyl acrylate and having an MI of 20 g/10 min at 190° C., 2160 g) and 60 parts by weight of maleic anhydride. To this solution was added with stirring 1.2 parts by weight of benzoyl peroxide dissolved in 100 parts by weight of xylene over 3 hours, while the solution was kept at 170° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 37.1 wt% of ethyl acrylate and 1.46 meq/g of carboxyl group and having an MI of 12 g/10 min (as measured at 190° C. and 2160 g).

Polymer (X) thus obtained was mixed with ethylene-ethyl acrylate copolymer (Y) containing 25 wt% of ethyl acrylate and having an MI of 6, the mixing ratio of X/Y being 3/100. The resulting composition was found to have the following values which satisfy the formulas (I) to (III), but do not satisfy the formula (IV).

$|Vx - Vy| = 0.121$ $Vx \cdot Wx + Vy \cdot Wy = 0.254$ $Cx \cdot Wx = 0.043$ $Wx/Wy = 0.03$ Using this composition for layer (C), lamination was performed in the same way as in Example 2. The resulting laminate was good in appearance, but peel strength was only 0.2 kg/cm.

COMPARATIVE EXAMPLE 6

Coextrusion was performed in the same way as in Example 3 except that the copolymer (X) obtained in Example 3 was used alone for the interlayer (C).

The resulting laminate was poor in appearance due to large irregularities on the overall surface. It was impossible to measure the peel strength because of irregular laminar structure.

COMPARATIVE EXAMPLE 7

In 1000 parts by weight of purified xylene were dissolved 100 parts by weight of ethylene-ethyl acrylate copolymer (containing 25 wt% of ethyl acrylate and having an MI of 6 g/10 min at 190° C., 2160 g) and 5 parts by weight of maleic anhydride. To this solution was added with stirring 0.1 parts by weight of benzoyl peroxide dissolved in 100 parts by weight of xylene over 3 hours, while the solution was kept at 140° C. After addition was complete, stirring was continued for 20 minutes. After cooling, the reaction solution was poured into a large amount of purified acetone to cause the polymer to separate out. The resulting polymer was purified by reprecipitation from xylene as solvent and acetone as non-solvent. Thus there was obtained polymer (X) containing 24.9 wt% of ethyl acrylate and 0.058 meq/g of carboxyl group and having an MI of 5.1 g/10 min (as measured at 190° C. and 2160 g).

Coextrusion was performed in the same way as in Example 2 except that the copolymer (X) obtained as mentioned above was used alone for the interlayer (C).

The resulting laminate was poor in appearance due to fine irregularities, and peel strength was only 0.3 kg/cm.

It is to be noted that the resin obtained in this comparative example is quite similar to the composition in Example 4 with respect to the content of ethyl acrylate and carboxyl group. Nevertheless, the resulting laminate is quite different in appearance and peel strength from that in Example 4.

What is claimed is:

1. A laminate structure comprising (a) a layer of a saponified product of an ethylene-vinyl acetate copolymer containing 20 to 55 mole % of ethylene and having a degree of saponification of at least 90 mole % and (B) a layer of hydrophobic thermoplastic resin, with (C) a bonding interlayer placed therebetween which comprises a composition of (X) a polymer of ethylene, an acrylic acid ester, and an ethylenically unsaturated carboxylic acid or anhydride thereof and (Y) a polymer of ethylene and an acrylic acid ester, said polymers (X) and (Y) being formulated so that the following formulas (I), (II), (III), and (IV) are satisfied:

$$|V_x - V_y| \leq 0.15 \quad \text{(I)}$$

$$0.10 \leq V_x \cdot W_x + V_y \cdot W_y \leq 0.45 \quad \text{(II)}$$

$$0.03 \leq C_x W_x \leq 1 \quad \text{(III)}$$

$$0.05 \leq W_x/W_y \leq 10 \quad \text{(IV)}$$

where:

$V_x$: content (in weight fraction) of acrylic acid ester in polymer (X)

$V_y$: content (in weight fraction) of acrylic acid ester in polymer (Y), $C_x$: content (in meq/g) of carboxyl group of ethylenically unsaturated carboxylic acid or anhydride thereof in polymer (X), $W_x$: quantity (in weight fraction) of polymer (X), and $W_y$: quantity (in weight fraction) of polymer (Y).

2. A laminate structure as set forth in claim 1 wherein said hydrophobic thermoplastic resin is a saturated polyester resin.

* * * * *